United States Patent
Shimomura (12) United States Patent (10) Patent No.: US 7,559,567 B2
(45) Date of Patent: Jul. 14, 2009

(54) COMBINATION FOOTBOARD AND FOOTREST FOR MOTORCYCLE

(75) Inventor: Tadashi Shimomura, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 0 days.

(21) Appl. No.: 11/696,069

(22) Filed: Apr. 3, 2007

(65) Prior Publication Data
US 2007/0241533 A1    Oct. 18, 2007

(30) Foreign Application Priority Data
Apr. 3, 2006    (JP) ............... 2006-102415

(51) Int. Cl.
*B62J 25/00* (2006.01)
(52) U.S. Cl. ..................... 280/291
(58) Field of Classification Search ............. 280/291
See application file for complete search history.

(56) References Cited

U.S. PATENT DOCUMENTS

| 6,435,585 B1 * | 8/2002 | Aoki | 296/37.1 |
| 6,588,529 B2 * | 7/2003 | Ishii et al. | 180/219 |
| 7,028,800 B2 * | 4/2006 | Yagisawa et al. | 180/219 |
| 7,270,212 B2 * | 9/2007 | Takahashi et al. | 180/219 |
| 2005/0269800 A1 * | 12/2005 | Suzuki et al. | 280/291 |

FOREIGN PATENT DOCUMENTS

JP    08-058657    3/1996

* cited by examiner

*Primary Examiner*—Lesley D Morris
*Assistant Examiner*—Daniel Yeagley
(74) *Attorney, Agent, or Firm*—Hogan & Hartson LLP

(57) ABSTRACT

A motorcycle with increased freedom in selection of a location in which a passenger puts a foot has a footboard, a seat and a side cover. The footboard includes footboard extensions extending rearwardly of a foremost portion of the seat toward the rear. The footboard extensions include a projection projecting outward of a vehicle body beyond a portion of the side cover positioned outermost in a vehicle width direction. Folding type footrests for a passenger are below the projections.

7 Claims, 8 Drawing Sheets

OUTER SIDE ←→ INNER SIDE

[Fig. 6]

OUTER SIDE ← → INNER SIDE

COMBINATION FOOTBOARD AND FOOTREST FOR MOTORCYCLE

RELATED APPLICATIONS

This application claims the benefit of priority under 35 USC 119 of Japanese patent application no. 2006-102415, filed on Apr. 3, 2006, which application is hereby incorporated by reference in its entirety.

BACKGROUND OF THE INVENTION

1. Field of the Invention

The present invention relates to a motorcycle, and more particular, to a motorcycle on which a passenger in addition to a rider can be seated.

2. Description of Related Art

A "double-ride motorcycle" includes a passenger seat rearwardly of a rider seat, and also has a footrest for bracing the passenger's legs when the motorcycle is decelerated, in order to provide a stable ride.

The footrest is generally provided below the passenger seat and is mounted to a bracket clamped to a body frame. A footrest has been proposed that can fold and be stored inside the vehicle body when no passenger is present, thereby improving the outward appearance of the motorcycle (JP-A-8-58657).

Since the footrest is fixed in position, however, the passenger cannot select the location in which his/her feet rest and therefore may not be comfortable. For example, where a passenger's legs are shorter than the distance between the seat and the footrest, the passenger's feet do not reach the predetermined footrest and cannot rested thereon or braced when the motorcycle is decelerated.

Also, since a passenger who puts feet on a predetermined footrest keeps the same sitting posture at all times and feels much fatigue. Thus, the footrest should be arranged in accordance with the passenger's physical constitution.

To address these problems, a plurality of footrests provided on sides of the body frame, so that the passenger can select a suitable footrest from the plurality of footrests, has been proposed. However, such a design increases labor time, number of parts and costs, and adversely impacts the vehicle design.

SUMMARY OF THE INVENTION

The invention addresses these problems and provides a motorcycle that increases freedom in selection of a location in which a passenger puts a foot, so that the passenger has a stable ride.

The invention provides a motorcycle, on which a passenger in addition to a rider can be seated. The motorcycle comprises a footboard, on which the rider's foot is put; a seat, on which the rider and the passenger are seated; and a side cover provided below the seat. The footboard includes a footboard extension extending rearwardly of a foremost position of the seat. The footboard extension includes a projection projecting outwardly laterally of a vehicle body beyond the outermost positioned portion of the side cover in a vehicle width direction. A folding type footrest for a passenger is provided below the projection.

The seat preferably includes a rider seat portion, on which a rider is seated, and a passenger seat portion, on which a passenger is seated. At least a portion of the projection and the folding type footrest are arranged forwardly of a portion of the side cover positioned outermost in the vehicle width direction and the passenger seat portion.

The footboard extension is preferably formed integral with the footboard.

The footboard extension includes an inclined portion inclined differently from the footboard.

The footboard extension is preferably formed on an outer edge thereof with an antislipping ridge.

The folding type footrest preferably includes a portion that is positioned outwardly of an outermost portion of the footboard extension when taken out.

A pivotal point about which the folding type footrest is folded is preferably arranged inwardly of an outermost position of the footboard extension.

With the motorcycle according to the invention, since the footboard, on which a rider's feet are put, includes a footboard extension extending rearwardly of a foremost position of the seat and the footboard extension includes a projection projecting outwardly laterally of a vehicle body beyond the outermost positioned portion of the side cover provided below the seat, a passenger seated on the seat can put feet on the footboard extension without obstruction by the side cover. Since the folding type footrest for a passenger is provided below the projection, the passenger can select either the footboard extension or the folding type footrest to put feet thereon, increasing freedom in selection of a foot put location in a heightwise direction of a vehicle body.

Other features and advantages of the invention will be apparent from the following detailed description, taken in conjunction with the accompanying drawings which illustrate, by way of example, various features of embodiments of the invention.

DETAILED DESCRIPTION OF THE INVENTION

An embodiment of the invention is described below with reference to the drawings. The invention is not limited to the following embodiments.

Figure 1:
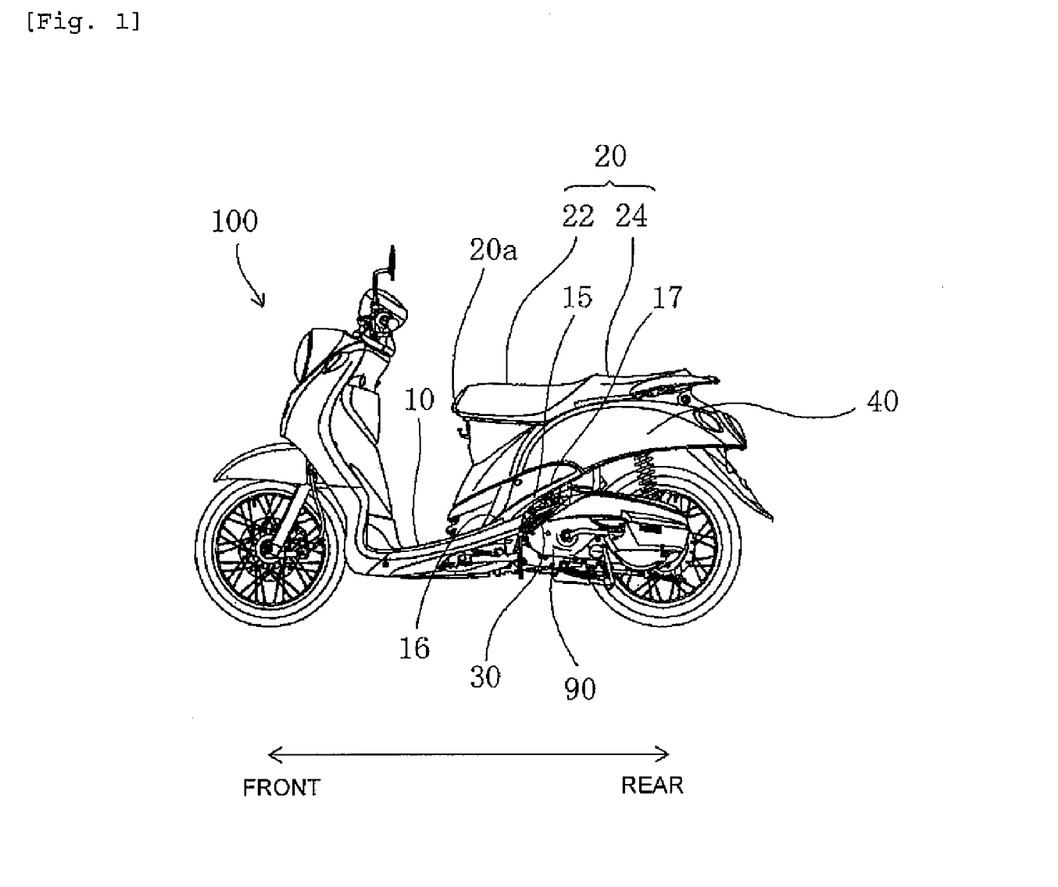
FIG. 1 is a side view of a motorcycle according to one embodiment of the invention.

FIG. 1 is a side view of a motorcycle 100 according to one embodiment of the invention.

A passenger in addition to a rider can be seated on seat 20 of motorcycle 100, which also includes a footboard 10, footboard extensions 15, a side cover 40, and folding type footrests 30.

Seat 20 extends from a center of the vehicle body to the rear. Footboard 10 is arranged forwardly and downwardly of seat 20. Footboard 10 includes footboard extensions 15 extending rearwardly of a foremost portion 20a of seat 20 toward the rear of the vehicle body. Footboard extensions 15 comprise a pair of left and right members positioned below seat 20.

Figure 2:
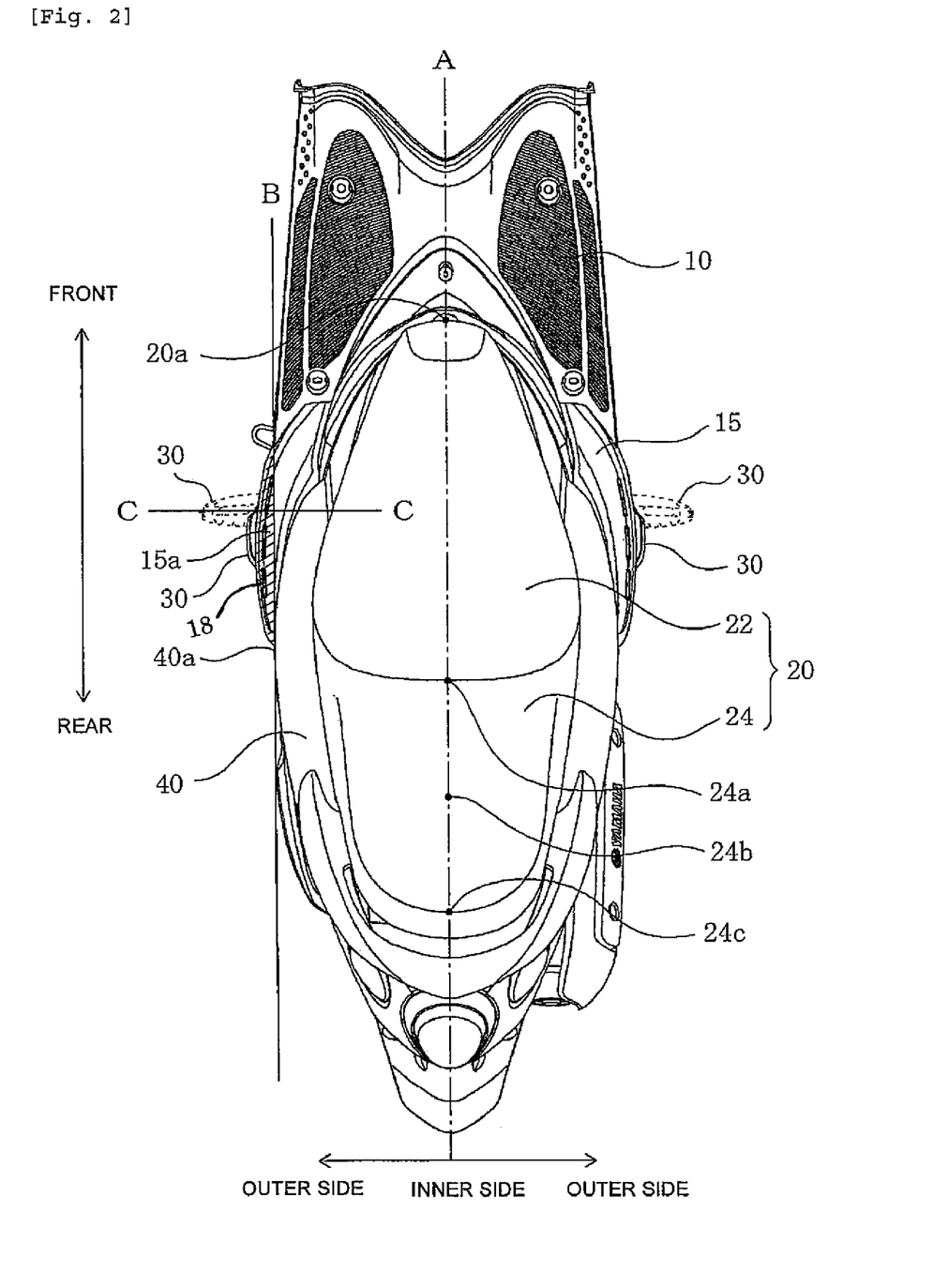
FIG. 2 is a top view of a part of the motorcycle of FIG. 1.

Side cover 40 is arranged between footboard extensions 15 and seat 20, and protects electrical equipment, etc. arranged below seat 20. A projection 15a of footboard extensions 15 projects outward beyond an outermost projecting portion 40a of side cover 40 in a vehicle width direction (FIG. 2). Folding type footrests 30 are provided below projections 15a.

Since projections 15a of footboard extensions 15 extend downwardly of seat 20 and project outward beyond outermost projecting portion 40a of side cover 40, a passenger seated on seat 20 can put feet on footboard extensions 15 without obstruction by side cover 40. Since footrests 30 are further provided below projections 15a, the passenger can select either of footboard extensions 15 and footrests 30 to put feet thereon, thereby increasing freedom in selection of a foot put location in a vehicle height direction.

Thus, a passenger can freely select a foot put location suited to one's physical constitution to obtain comfortable seating. Also, when pain is felt in maintaining the same posture on a long drive, the foot put location can be changed to vary seating posture, thereby suppressing fatigue and reviving spirits.

FIG. 2 is a top view of an essential part of motorcycle 100. The portion forwardly of the handle of motorcycle 100 is omitted for sake of understanding.

Seat 20 extends in a longitudinal direction of the vehicle body and includes a seat portion 22 for a rider, formed on a front side and a seat portion 24 for a passenger, formed on a rear side. Footboard 10, on which a rider's feet are put, is arranged between seat 20 and the handle. Footboard extensions 15 extend to the rear of foremost portion 20a of seat 20 from footboard 10, and comprise a pair of left and right extensions.

Side cover 40 is provided above footboard extensions 15 and has a substantially curved surface projecting outwardly of the vehicle body with the left and right of seat 20 interposed therebetween. Folding type footrests 30 for a passenger are provided below side cover 40 to be positioned below footboard extensions 15.

Footboard extensions 15 and footrests 30 according to the embodiment are mounted as follows in the vehicle width direction.

Footboard extensions 15 are formed further outside side cover 40, which covers sides of seat 20 positioned centrally in the vehicle width direction. Footboard extensions 15 comprise projection 15a projecting outward beyond outermost projecting portion 40a of the side cover. Specifically, footboard extensions 15 comprise projection 15a projecting outwardly of the vehicle body beyond a straight line B, which passes portion 40a of side cover 40 positioned on an outermost side of the vehicle body and is in parallel to a center line A extending in the longitudinal direction of the vehicle body. Accordingly, a passenger puts feet on projections 15a of footboard extensions 15 in a natural posture without being caught by projecting portions 40a of side covers 40.

Folding type footrests 30 are provided further below projections 15a and comprise a portion positioned outside projections 15a of footboard extensions 15. In a pulled-out state, a passenger spreads feet outwardly of projections 15a whereby it is possible to put feet also on footrests 30. As a result, a passenger can put feet on either footboard extensions 15 or footrests 30, so that freedom in selection of a foot put location in the vehicle height direction is provided.

Footboard extensions 15 and footrests 30 are formed laterally of seat 20 in the longitudinal direction of the vehicle body and positioned forwardly of passenger seat portion 24 and outwardly projecting portions 40a of side covers 40. At least portions of projections 15a of footboard extensions 15 and footrests 30 are provided toward the rear of the vehicle body relative to foremost portion 20a of seat 20 and are positioned forwardly of an intermediate location 24b between a front end 24a and a rear end 24c of passenger seat portion 24, and forwardly of portions 40a of side covers 40, which are positioned outermost in the vehicle width direction.

Since projections 15a and footrests 30 are formed laterally of seat 20, a situation is avoided in which a passenger's feet thrown out forward do not get to projections 15a and footrests 30. Since projections 15a and footrests 30 are arranged forwardly of passenger seat portion 24 and projecting portions 40a of side covers 40, a passenger can smoothly put forwardly thrown-out feet without obstruction by side cover 40, so that an improvement in riding quality is achieved.

While JP-A-8-58657 discloses a motorcycle with a folding type footrest, all members except the footrest are arranged inside an outermost projecting portion of a side cover. Accordingly, in contrast to motorcycle 100 of the present invention, it is difficult for a seated passenger to put feet on a member other than the footrests, so that there is no freedom in selection of a foot put location in a vehicle height direction and it is difficult to attain a comfortable riding position.

Linear ridges 18 are formed along outer edges of upper surfaces of footboard extensions 15 of motorcycle 100. Passenger's feet are caught by linear ridges 18 and prevented from slipping from footboard extensions 15, thus surely fixing feet to footboard extensions 15. Linear ridges 18 are not limited to such shape but may have other shapes that prevent slippage, for example, an irregular surface treatment.

A similar surface working can also be applied to footrests 30 to produce a slip prevention effect, so that feet put on both footboard extensions 15 and footrests 30 are surely fixed.

Footboard 10 and footboard extensions 15 are preferably formed integral with each other, thereby decreasing the number of parts and keeping manufacturing costs to a low level. However, footboard extensions 15 and footboard 10 may also be separate members, which is advantageous in that footboard extensions 15 are easier to mount and dismount. For example, when a plurality of footboard extensions 15 positioned differently in a body height direction are prepared and a passenger mounts footboard extensions 15, out of them, suited to one's physical constitution, it is not necessary to exchange the whole footboard and it suffices to exchange only extensions 15, so that it is possible to mount the extensions readily.

Figure 3:
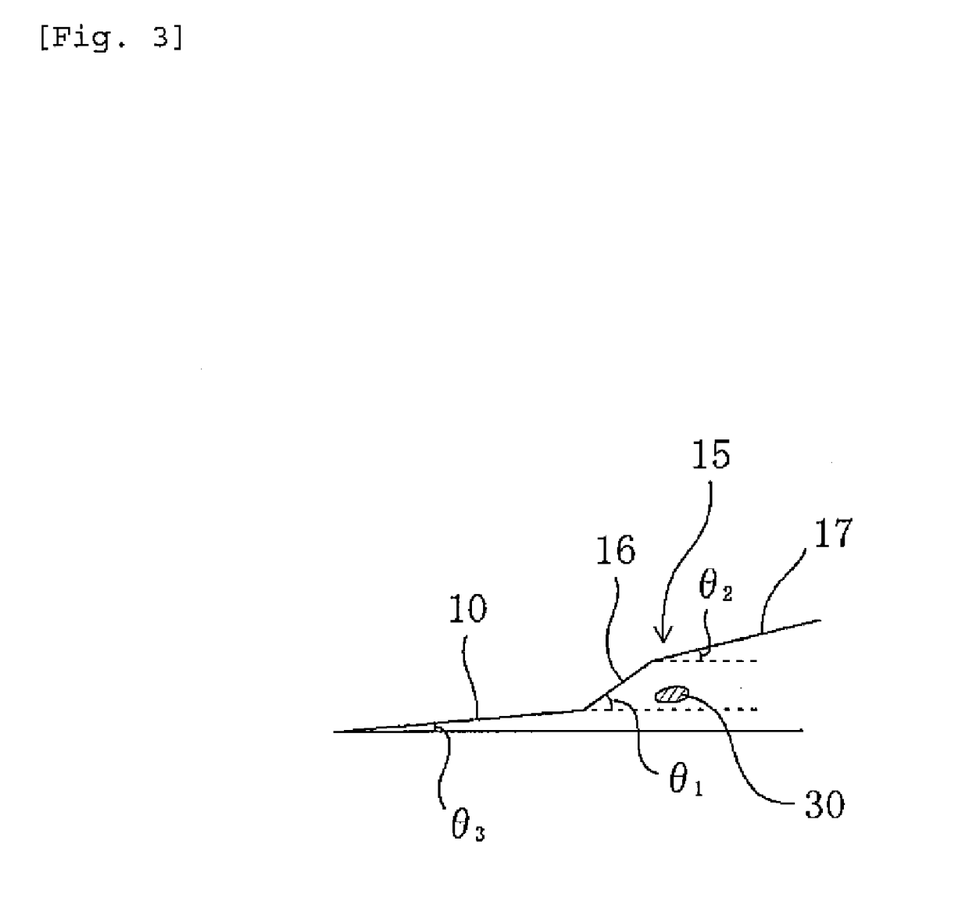
FIG. 3 illustrates angles of forward inclination of a footboard and a footboard extension.

The structure of footboard extension 15 is described with reference to FIG. 3, which illustrates angles of forward inclination of footboard 10 and footboard extension 15. Footboard extension 15 forms a step relative to footboard 10. A step structure increases freedom of foot put location in a heightwise direction. As shown in FIG. 3, footboard extension 15 includes a forward extension 16 on a vehicle body front side and a rearward extension 17 on a vehicle body rear side, the respective extensions being inclined at predetermined different angles. $\theta_1$ indicates an angle of forward inclination of the forward extension 16 and $\theta_2$ indicates an angle of forward inclination of the rearward extension 17. Footboard 10 is inclined at a predetermined angle $\theta_3$ of forward inclination.

When footboard 10 and forward extension 16 are constructed so that angles of forward inclination thereof are in the order of $\theta_1 > \theta_2 > \theta_3$, footboard extension 15 forms a step relative to footboard 10 and owing to the step structure, footboard extension 15 is arranged above the vehicle body relative to a rearward extension of footboard 10, which is inclined at the angle $\theta_3$. Footrests 30 being foot put members for a passenger are provided on the rearward extension of footboard 10.

With such construction, footboard extensions 15 are arranged above footrests 30, so that a passenger can put feet on footboard extensions 15 and footrests 30, which are differently positioned in the body heightwise direction, thereby ensuring freedom of a foot put location.

According to the embodiment, forward extension 16 and rearward extension 17 are constructed so that angles of forward inclination thereof are put in the order of $\theta_1 > \theta_2$. Thereby, a passenger can put feet bn rearward extension 17, an angle of forward inclination of which is gentle, so that feet putting quality is favorable.

In addition, rearward extension 17 and footboard 10 may be inclined at the same angle ($\theta_2 = \theta_3$). With this construction, the rider's and passenger's foot put members are arranged in parallel, so that the rider and passenger feel a feet putting quality having a feeling of integration.

Figure 4:
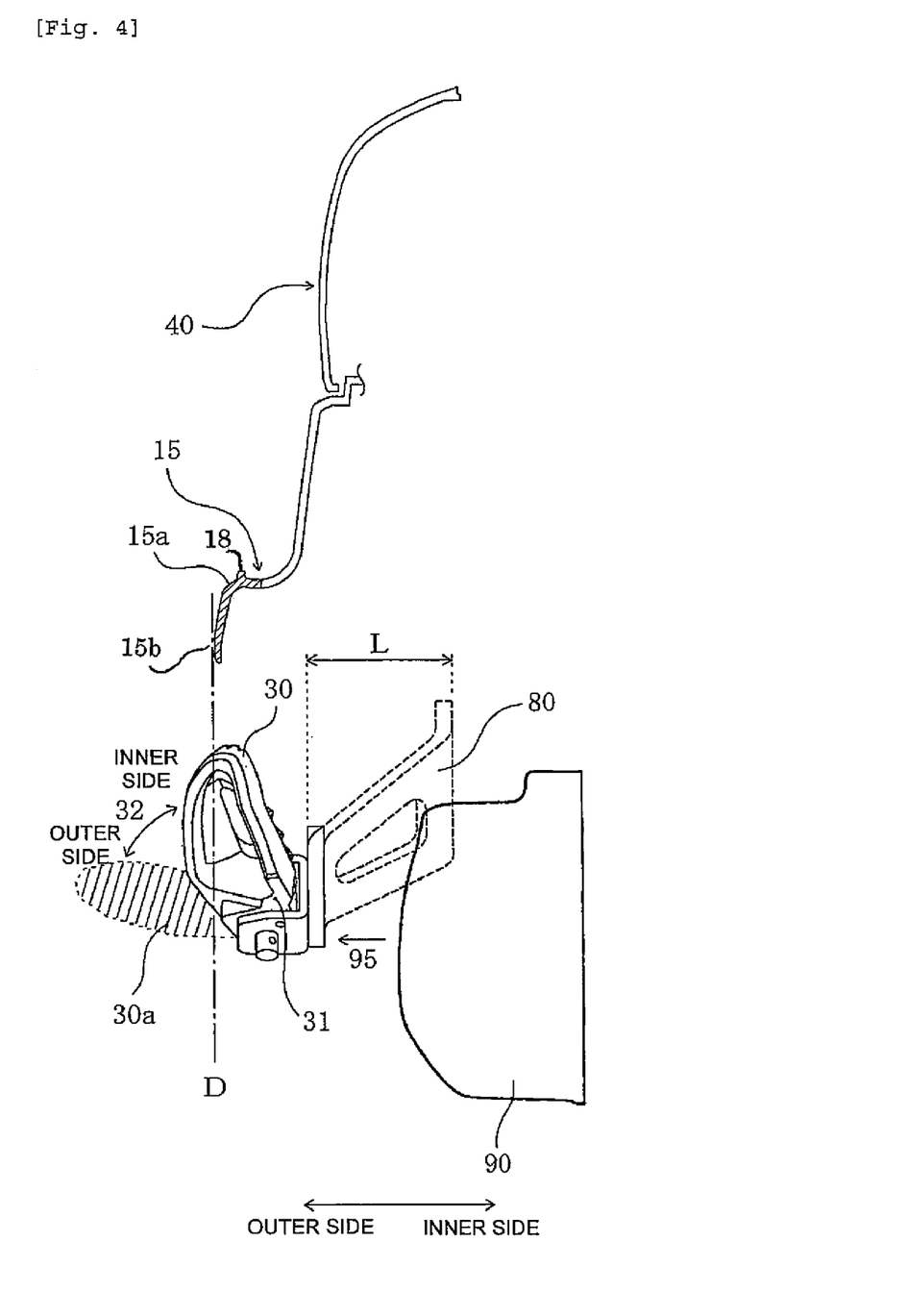
FIG. 4 is a cross section taken along line C-C of FIG. 2, as viewed from the rear of the vehicle (when a transmission case cover is mounted).

A structure of footrests 30 is now described. FIG. 4 is a schematic view showing an outline of a cross section taken along line C-C in FIG. 2, as viewed from the rear of the vehicle.

Footrests 30 include a folding mechanism and are supported pivotally on a body frame (not shown) through brackets 80, which project outwardly and downwardly of the vehicle body from the body frame. Footrests 30 can be folded inwardly of the vehicle body about pivotal points 31 according to the presence or absence of a passenger, or can be taken outside the vehicle body (see arrow 32).

Footboard extensions 15 are above footrests 30 and side covers 40 are above footboard extensions 15. Footrests 30 include a portion 30a, which is positioned outwardly of a perpendicular line D from an outermost positioned portion 15b of projection 15a in a taken-out state. Accordingly, a passenger can spread feet outwardly of projections 15a to put feet on portions 30a, whereby it is possible to put feet on either footboard extensions 15 or footrests 30. As a result, freedom in selection of a foot put location in the heightwise direction is increased.

Pivotal point 31, which makes a center of turning of footrest 30, is positioned inwardly of perpendicular line D from the outermost positioned portion 15b of projection 15a. Accordingly, when footrest 30 is folded, a major part of footrest 30 is received below footboard extension 15 so as to be not conspicuous in outward appearance. In this manner, footboard extensions 15 receive therebelow footrests 30 put in non-use and thus serve not only as foot put members for a passenger but also serve to make the vehicle design favorable.

An arrangement and construction around a location in which footrests 30 are mounted is now described. As described above, a foot put location on footrest 30 as taken out projects outwardly of the vehicle body relative to the outermost positioned portion 15b of extension 15 in order to ensure a foot put space of a passenger. With this construction, since footrest 30 projecting outward and the body frame are distant from each other, it is necessary to design a length L in the vehicle width direction of bracket 80, which interposes between both, to make the same large. In this manner, when brackets 80 are made long in length L in the vehicle width direction, the following advantage is given.

Figure 5:
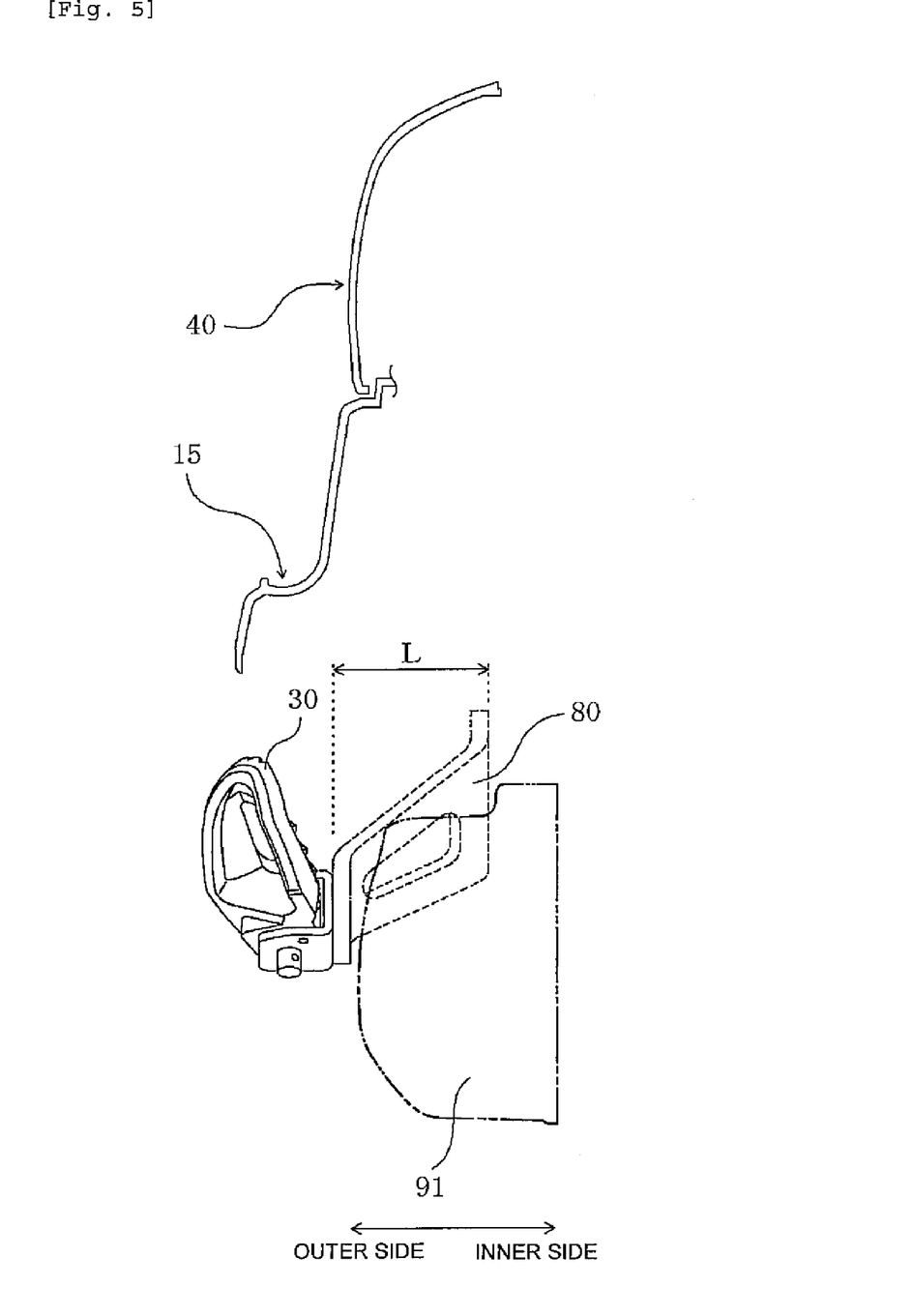
FIG. 5 is a cross section taken along line C-C of FIG. 2, as viewed from the rear of the vehicle (when the transmission case cover is slid).
Figure 6:
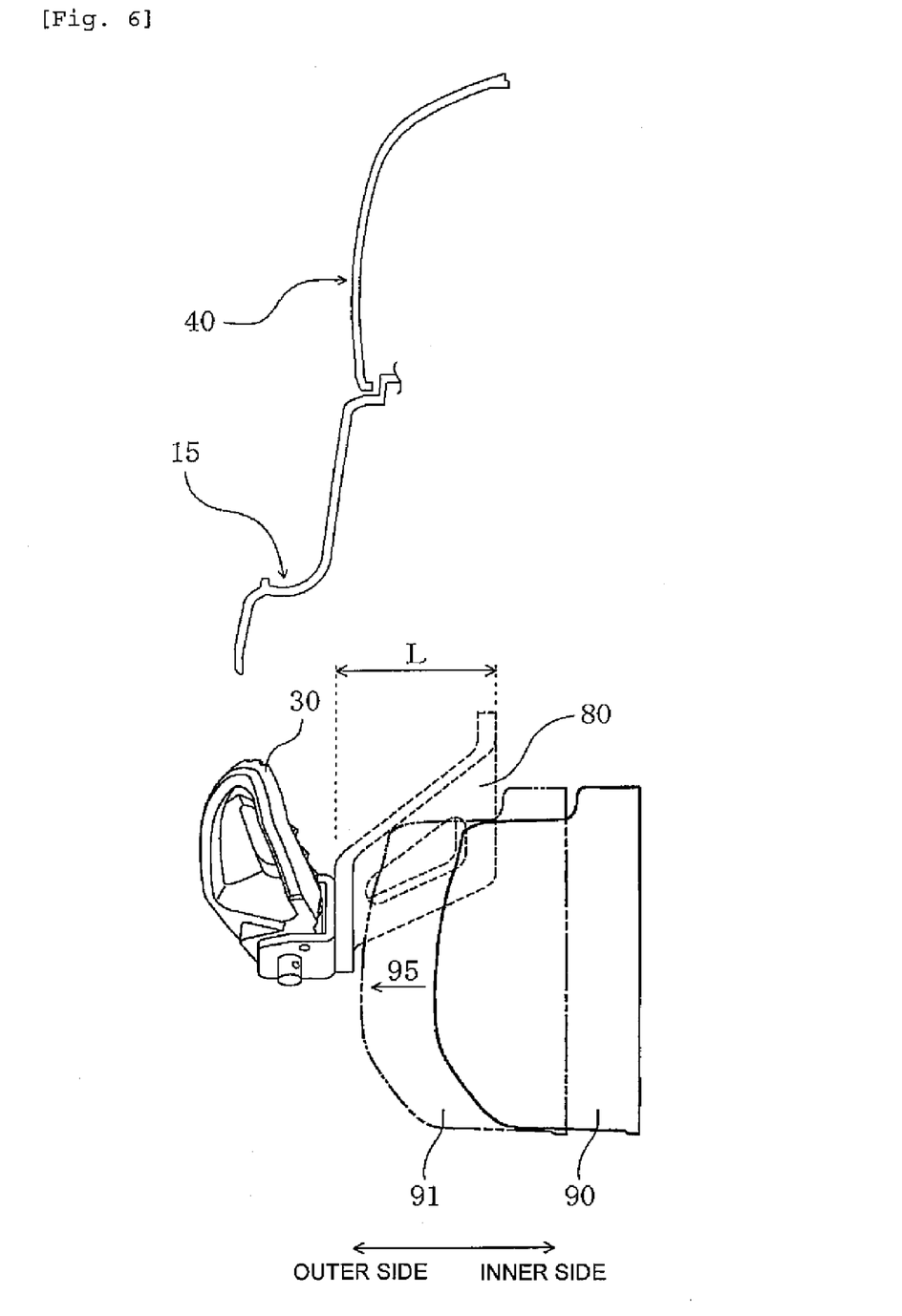
FIG. 6 is a cross section taken along line C-C of FIG. 2, as viewed from the rear of the vehicle (when the transmission case cover is mounted and slid).

With reference to FIGS. 5 and 6, a transmission case cover 90, which covers a transmission case body with a V-belt, etc. received therein, is mounted inwardly of footrest 30 toward the vehicle body, and in case of carrying out maintenance of the V-belt, etc., dismount work is performed with transmission case cover 90 slid in a direction of an arrow 95. Transmission case cover 91 shown in FIG. 5 is in a slid position, which is necessary at a minimum, since when the transmission case cover is to be dismounted, it is not supported on the transmission case body. Since transmission case cover 90 and footrest 30 are positionally close to each other in the body height direction, footrest 30 provides for support in the case where a distance between both is small, so that the work of dismounting transmission case cover 90 is made difficult. Hereupon, before the maintenance work for the V-belt, etc. is started, it is first necessary to dismount footrest 30 from bracket 80 to ensure a space for mounting and dismounting of transmission case cover 90.

According to the embodiment, as shown in FIG. 6, since bracket 80 is made long in length L in the vehicle width direction, there is still sufficient space between the bracket and footrest 30 even when transmission case cover 90 is slid to a position of transmission case cover 91. Accordingly, since it is possible to mount and dismount transmission case cover 90 in a state in which footrest 30 is mounted, the work of mounting and dismounting is made easier and working efficiency is improved.

While the embodiment described above includes footboard extensions 15 with a relatively gentle step with footboard 10 as a reference, the invention is not so limited. It suffices that footboard extensions 15 extend rearwardly of a foremost position of the seat from the footboard. Thus, a step formed by the footboard extension is not limited to a relatively gentle step but may be a steep step.

Figure 7:
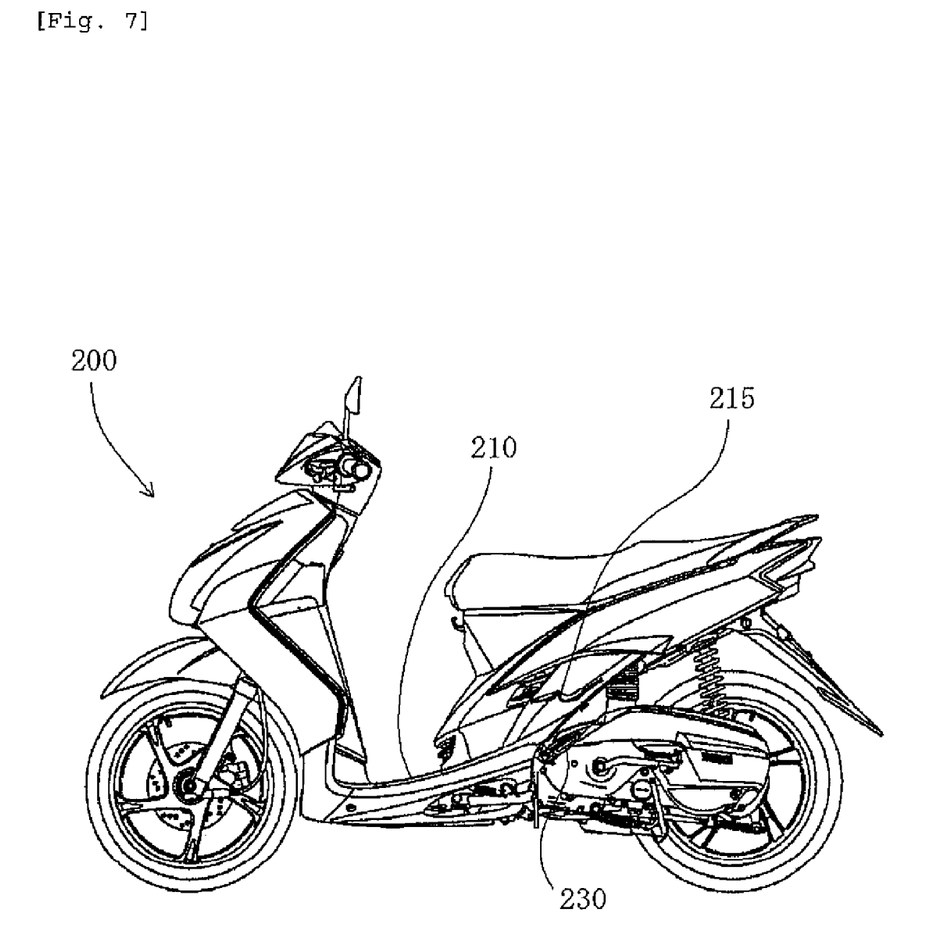
FIG. 7 is a side view of a motorcycle according to another embodiment of the invention.
Figure 8:
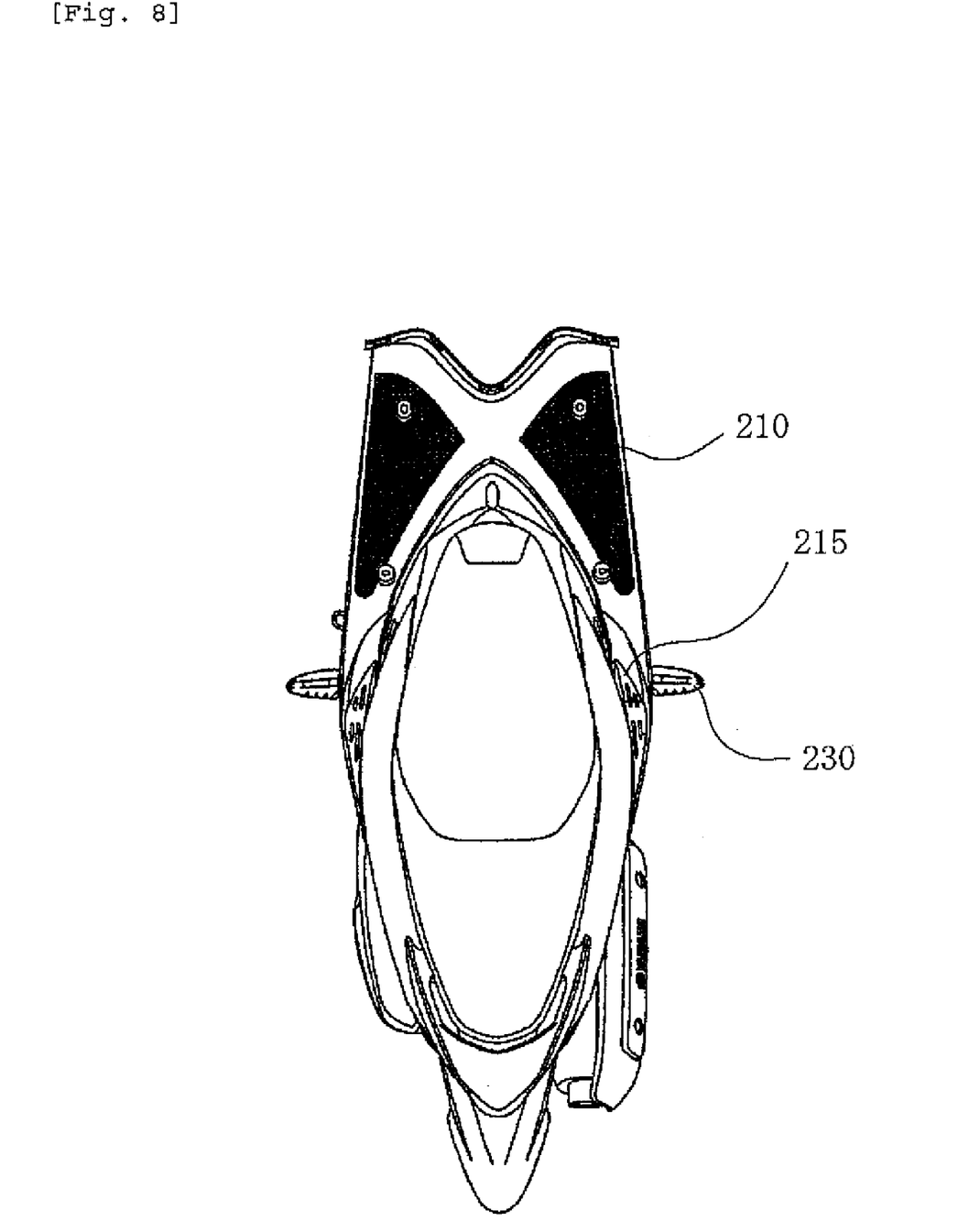
FIG. 8 is a top view of a part of the motorcycle of FIG. 7 (a state, in which a footrest is taken out).

For example, FIGS. 7 and 8 show a motorcycle 200, in which a footboard extension includes a step having a large difference of elevation with a footboard as a reference. Even with a construction having such large step, a passenger can select either footboard extension 215 or footrest 230 to put feet thereon, so that freedom in selection of foot put location in a heightwise direction is increased.

According to the invention, a motorcycle is provided with increased freedom in selection of a location in which a passenger puts feet.

The particular embodiments of the invention described in this document should be considered illustrative, rather than restrictive. Modification to the described embodiments may be made without departing from the spirit of the invention as defined by the following claims.

The invention claimed is:

1. A motorcycle, on which a passenger in addition to a rider can be seated, comprising
    a footboard, on which the rider's foot is put;
    a seat, on which the rider and the passenger are seated;
    a side cover provided below the seat,
    wherein the footboard includes a footboard extension that is continuous with the footboard and extends rearwardly of a foremost position of the seat, and
    wherein the footboard extension includes a projection projecting outwardly laterally of a vehicle body beyond the outermost positioned portion of the side cover in a vehicle width direction; and
    a folding footrest for the passenger provided below the projection and that is extendable between a folded-in state and a folded-out state in which a passenger's foot can be nut on the folding footrest,
    wherein in the folded-in state, the folding footrest projects laterally outward in the vehicle width direction of the outermost positioned portion of the side cover.

2. The motorcycle according to claim 1, wherein the seat includes a rider seat portion, on which the rider is seated, and a passenger seat portion, on which the passenger is seated, and at least a portion of the projection and the folding footrest are arranged forwardly of a portion of the side cover positioned outermost in the vehicle width direction and the passenger seat portion.

3. The motorcycle according to claim 1, wherein the footboard extension is formed integral with the footboard.

4. The motorcycle according to claim 1, wherein the footboard extension includes an inclined portion inclined differently from the footboard.

5. The motorcycle according to claim 1, wherein the footboard extension is formed on an outer edge thereof with an antislipping ridge.

6. The motorcycle according to claim 1, wherein the folding footrest includes a portion, which is positioned outwardly of an outermost portion of the footboard extension when taken out.

7. The motorcycle according to claim 1, wherein a pivotal point making a center about which the folding footrest is folded, is arranged inwardly of an outermost position of the footboard extension.

* * * * *